(12) United States Patent
Kan

(10) Patent No.: US 9,646,178 B2
(45) Date of Patent: May 9, 2017

(54) SECURE DATA STORAGE BASED ON PHYSICALLY UNCLONABLE FUNCTIONS

(71) Applicant: Empire Technology Development LLC, Wilmington, DE (US)

(72) Inventor: Edwin Kan, Ithaca, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 282 days.

(21) Appl. No.: 14/515,425

(22) Filed: Oct. 15, 2014

(65) Prior Publication Data

US 2016/0110130 A1  Apr. 21, 2016

(51) Int. Cl.
| | | |
|---|---|---|
| *H04L 9/32* | (2006.01) | |
| *G06F 21/79* | (2013.01) | |
| *G11C 16/04* | (2006.01) | |
| *G11C 16/10* | (2006.01) | |
| *H04L 9/08* | (2006.01) | |
| *G06F 21/34* | (2013.01) | |

(52) U.S. Cl.
CPC .......... *G06F 21/79* (2013.01); *G11C 16/0408* (2013.01); *G11C 16/10* (2013.01); *H04L 9/0866* (2013.01); *H04L 9/3278* (2013.01); *G06F 21/34* (2013.01)

(58) Field of Classification Search
CPC ... G11C 16/0408; G11C 16/10; H04L 9/0866; H04L 9/3278; G06F 21/79
See application file for complete search history.

(56) References Cited

U.S. PATENT DOCUMENTS

| | | | | |
|---|---|---|---|---|
| 8,176,106 | B2 * | 5/2012 | Schrijen | G09C 1/00 |
| | | | | 708/250 |
| 8,286,005 | B2 | 10/2012 | Matsuda et al. | |
| 8,971,527 | B2 * | 3/2015 | Brightsky | H04L 9/0866 |
| | | | | 380/278 |
| 9,324,436 | B2 * | 4/2016 | Kim | G11C 16/10 |

(Continued)

OTHER PUBLICATIONS

"Open NAND Flash Interface," accessed at http://web.archive.org/web/20140819053101/http://www.onfi.org/, accessed on Sep. 13, 2014, pp. 1-2.

(Continued)

*Primary Examiner* — Vanthu Nguyen
(74) *Attorney, Agent, or Firm* — Turk IP Law, LLC

(57) ABSTRACT

Technologies are generally described for partial programming of memory having physically unclonable functions for secure data storage. In some examples, a sender that wishes to securely send data to a recipient using a physical memory may measure a program threshold average and a program threshold variation for bits in the memory and group the bits into different bins based on the measured average and variation. The sender may partially program the data to a set of bits selected from one or more of the bins by applying partial program pulses to the bits based on the program threshold average and the program threshold variation. The sender may then provide the partially-programmed memory to the recipient. The recipient may then partially program the received memory based on the program threshold average and the program threshold variation to recover the programmed data.

13 Claims, 10 Drawing Sheets

(56) References Cited

U.S. PATENT DOCUMENTS

| | | | |
|---|---|---|---|
| 2012/0222093 A1 | 8/2012 | Badenes et al. | |
| 2014/0126306 A1* | 5/2014 | Otterstedt | G11C 7/06 365/189.07 |
| 2015/0092777 A1* | 4/2015 | Watanabe | H01L 29/78696 370/392 |
| 2015/0278527 A1* | 10/2015 | Falk | G09C 1/00 726/25 |

OTHER PUBLICATIONS

Suh, G. E., and Devdas, S., "Physical Unclonable Functions for Device Authentication and Secret Key Generation," In Proc. of the 44th Design Automation Conference, pp. 9-14 (Jun. 4-8, 2007).

Wang, Y., et al., "Flash Memory for Ubiquitous Hardware Security Functions: True Random Number Generation and Device Fingerprints," In Proc. of the IEEE Symposium on Security and Privacy, pp. 33-47, May 2012.

Wang, Y., et al., "Hiding Information in Flash Memory," in Proceeding SP '13 Proceedings of the 2013 IEEE Symposium on Security and Privacy, pp. 271-285 (2013).

* cited by examiner

MEAN (α) = 19
STD DEV (Δ) = 5.78

BIN 1: BELOW α - Δ (~13) PULSES
BIN 1 MAP: 00000001

BIN 2: ABOVE α - Δ (~13) AND BELOW α + Δ (~26) PULSES
BIN 2 MAP: 11011110

BIN 3: ABOVE α + Δ (~26) PULSES
BIN 3 MAP: 00100000

Word to write: 11111111

510
AFTER α - Δ (13) PULSES OF WORD:

| "0" | "0" | "0" | "0" | "0" | "0" | "0" | "1" |
|---|---|---|---|---|---|---|---|
| 201 | 202 | 203 | 204 | 205 | 206 | 207 | 208 |
| 7 | 2 | 17 | 4 | 5 | 9 | 7 | 0 |

PULSES REMAINING TO CHANGE BIT

520
AFTER 2Δ (12) ADDITIONAL PULSES ON ALL BITS:

| "1" | "1" | "0" | "1" | "1" | "1" | "1" | "1" |
|---|---|---|---|---|---|---|---|
| 201 | 202 | 203 | 204 | 205 | 206 | 207 | 208 |
| 0 | 0 | 5 | 0 | 0 | 0 | 0 | 0 |

PULSES REMAINING TO CHANGE BIT

530
AFTER ANOTHER 2Δ (12) ADDITIONAL PULSES ON ALL BITS:

| "1" | "1" | "1" | "1" | "1" | "1" | "1" | "1" |
|---|---|---|---|---|---|---|---|
| 201 | 202 | 203 | 204 | 205 | 206 | 207 | 208 |
| 0 | 0 | 0 | 0 | 0 | 0 | 0 | 0 |

PULSES REMAINING TO CHANGE BIT

FIG. 5

SECURE DATA STORAGE BASED ON PHYSICALLY UNCLONABLE FUNCTIONS

BACKGROUND

Unless otherwise indicated herein, the materials described in this section are not prior art to the claims in this application and are not admitted to be prior art by inclusion in this section.

As electronic transactions involving sensitive information such as financial and personal information become more prevalent, concerns about data security also increase. To address these concerns, various security measures may be employed. Such security measures may include cryptographic techniques such as symmetric or asymmetric cryptographic algorithms, as well as physical security techniques that rely on disordered physical systems for authentication.

SUMMARY

The present disclosure generally describes techniques for secure data storage based on physically unclonable functions extracted from nonvolatile memories.

According to some examples, a method is provided to program data on a nonvolatile memory using a physically unclonable function. The method may include determining, for multiple memory bits on the nonvolatile memory, a program threshold average and a program threshold variation. The method may further include deriving, based on the program threshold average and the program threshold variation, a first bin threshold and a second bin threshold, and grouping the bits into at least a first group of bits, a second group, and a third group, based on at least the first bin threshold and the second bin threshold. The method may further include determining, based on at least the grouping of the bits, a set of bits to which the data is to be written, and performing a partial program of the data to the set of bits based on the program threshold average and the program threshold variation.

According to other examples, an encoding module is provided to program data on a nonvolatile memory with the knowledge of a physically unclonable function. The encoding module may include an interface configured to couple to multiple memory bits on the nonvolatile memory and a processor block. The processor block may be configured to determine, for the multiple memory bits, a program threshold average and a program threshold variation. The processor block may be further configured to derive, from the program threshold average and the program threshold variation, a first bin threshold and a second bin threshold, and group the multiple bits into at least a first bit group, a second bit group, and a third bit group, based on at least the first bin threshold and the second bin threshold. The processor block may be further configured to determine, based on at least the grouping of the bits and a key mask, a set of bits to which the data is to be written, and performing a partial program of the data to the set of bits based on the program threshold average and the program threshold variation.

According to further examples, a method is provided to read data from a nonvolatile memory with the knowledge of a physically unclonable function. The method may include applying at least one partial program pulse to at least one bit in multiple memory bits in the nonvolatile memory based on a program threshold average, a program threshold variation, and/or a bit group characterization associated with the at least one bit. The method may further include reading a resulting state of the multiple memory bits and deriving a final data based on the resulting state and another data value.

According to yet further examples, a decoding module is provided with additional partial program cycles in order to retrieve the correct data. The decoding module may include an interface configured to couple to multiple memory bits in the nonvolatile memory and a processor block. The processor block may be configured to apply at least one program pulse to one or more bits in the multiple memory bits based on a program threshold average, a program threshold variation, and/or a bit group characterization associated with the bit(s), where the program threshold may represent a number of partial program pulses to modify a bit in the memory bits from a first value to a second value. The processor block may be further configured to read a resulting state of the multiple memory bits and derive a final data based on the resulting state and another data value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is an illustration of a third example of data being written to and recovered from a memory device by use of physically unclonable functions;

DETAILED DESCRIPTION

Figure 1:
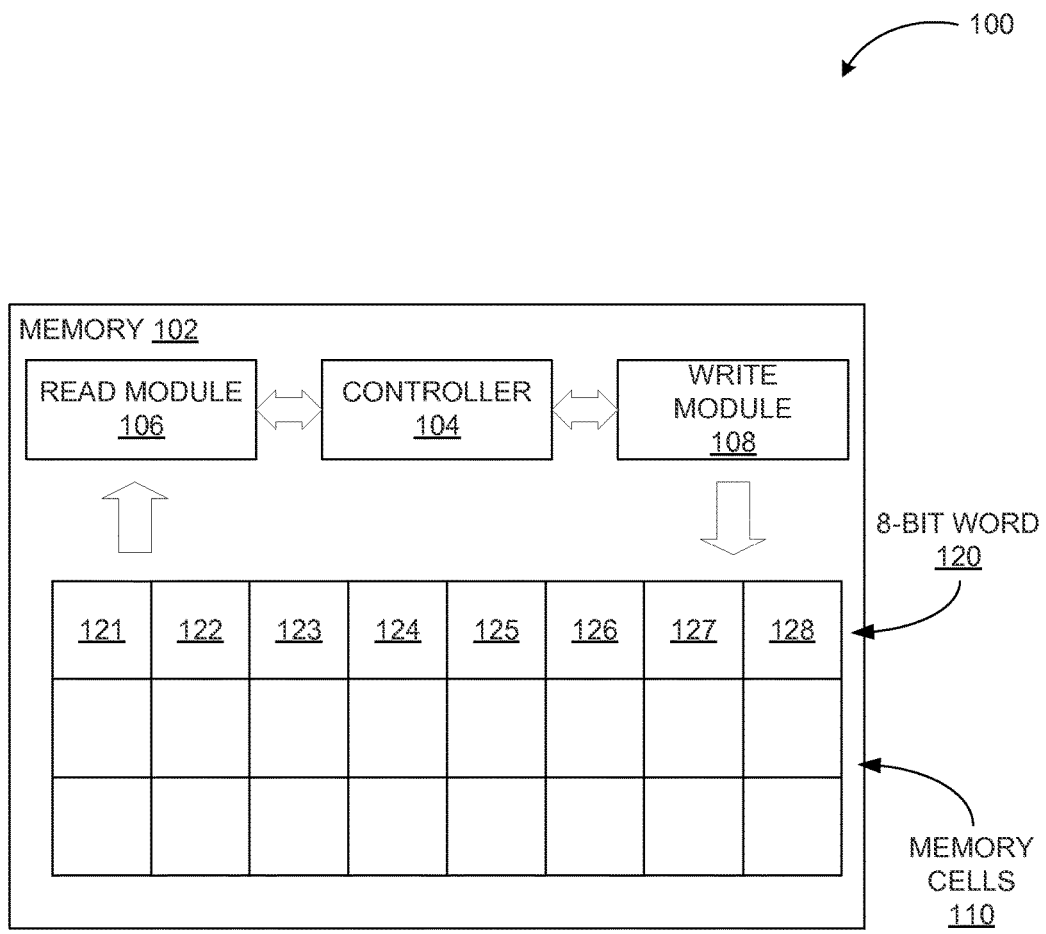
FIG. 1 is a system diagram illustrating an example nonvolatile memory device containing physically unclonable functions (PUFs)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to secure data storage based on physically unclonable functions (PUFs).

Briefly stated, technologies are generally described for partial programming of memory having physically unclonable functions for secure data storage. In some examples, a sender that wishes to securely send data to a recipient using a physical memory may measure a program threshold average and a program threshold variation for bits in the memory and group the bits into different bins based on the measured average and variation. The sender may partially program the data to a set of bits selected from one or more of the bins by applying partial program pulses to the bits based on the program threshold average and the program threshold variation. The sender may then provide the partially-programmed memory to the recipient. The recipient may then partially program the received memory based on the program threshold average and the program threshold variation to recover the programmed data.

FIG. 1 is a system diagram illustrating an example memory device having physically unclonable functions (PUFs), arranged in accordance with at least some embodiments described herein.

According to a system diagram 100, a physical memory 102 may include a memory controller 104, a read module 106, a program/erase module 108, and memory cells 110. The memory cells 110 may store one or more binary data bits per cell, and may be volatile (for example, dynamic random-access memory) or nonvolatile (for example, flash or EEPROM memory). In the latter case, the memory cells 110 may be implemented using floating gate devices that store data values as charge or charge carriers. A charge threshold may be used to delineate different data values. A memory cell storing more charge than the charge threshold may be considered to store one value (for example, a binary "1"), whereas a memory cell storing less charge than the charge threshold may be considered to store a different value (for example, a binary "0"). In other embodiments, the charge-to-value correspondence may be reversed (that is, charge less than the threshold corresponds to a binary "1"), and multi-level cells capable of storing multiple bits per cell may implement multiple thresholds. The memory cells 110 may be organized into one or more words, pages, blocks, or sections of any suitable size. In one embodiment, the memory cells 110 may include an 8-bit word 120 that includes memory cells 121-128.

The memory controller 104 may read data from or program data to the memory cells 110 using the read module 106 and the write module 108, respectively. In some embodiments, the memory controller 104 may program data to the memory cells 110 by using the program module 108 to adjust the charge stored on one or more memory cells to move above or below the charge threshold, thereby changing the data values stored on the memory cells. The program module 108 may adjust charge stored on a memory cell, such as the memory cell 121, by applying varying voltage and/or current values to the memory cell. In some embodiments, the program module 108 may apply one or more discrete voltage/current pulses, or "program pulses", to modify charge stored on the memory cell 121. Each program pulse may have a predetermined or dynamically-determined voltage or current value, and may last for a predetermined or dynamically-determined time duration. In some embodiments, a single program pulse may not supply sufficient charge to change the data value stored on the memory cell 121. Accordingly, the program module 108 may apply a series of program pulses to the memory cell 121 until enough charge has been supplied to change the data value stored on the memory cell 121. The number of program pulses that supplies enough charge to change the data value stored on a memory cell may be referred to as a "program threshold".

In some embodiments, the program threshold for a memory cell may vary according to the memory cell. For example, if the memory cell 121 is initially fully uncharged, the program module 108 may apply program pulses (having a particular voltage/current value and time duration) according to a first program threshold to the memory cell 121 to change the data value stored at the memory cell 121. In contrast, the program module 108 may have to apply program pulses (having the same voltage/current value and time duration) according to a second program threshold different from the first program threshold to the memory cell 122 to change the data value stored at the memory cell 122. The program threshold associated with a particular memory cell may depend on bit physical characteristics resulting from the memory manufacturing process. For example, the memory manufacturing process, being a physical and relatively stochastic (or random) process, may inherently result in memory cells having random variations in defect levels, dopant levels, and dimensions. These variations, while generally stable over time and not substantially affecting the functionality of the manufactured memory cells, nevertheless may vary the program/erase characteristics of the memory cells. As a result, different bits on a memory may have different program thresholds.

The random variations in memory cell program thresholds may be used as a security function. Because the variations originate from the physical memory manufacturing process, replication of the variations may be difficult if not outright impossible. Such variations may be referred to as "physically unclonable functions", or PUFs. The PUFs associated with variations in program thresholds may be combined with "partial program" operations. A partial program operation is an operation in which program pulses are applied to a bit, but a single or small number of program pulses are not enough to actually reach the memory cell's program threshold. For example, if a memory cell's program threshold requires 20 such partial program pulses, a partial program operation may involve the application of 10 program pulses, 15 program pulses, or any other number of program pulses less than 20 to the memory cell. In such a case, a read of the memory cell may indicate that the memory cell stores the original, unchanged data value, despite the applied program pulses. As a result, data may be encoded to the memory cell without being externally visible or readable. When data is secured using PUFs and partial program operations, an attacker would need to actually possess the physical instantiation of the PUFs and be able to identify the memory cells storing the data in order to be able to retrieve the stored data.

Figure 2:
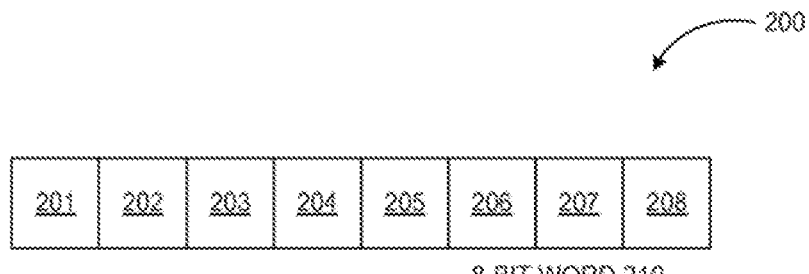
FIG. 2 is an illustration of the physically unclonable program characteristics of a memory device, which are represented by the number of partial program cycles to flip the state of the bit to the sense amplifier module.
Figure 2:
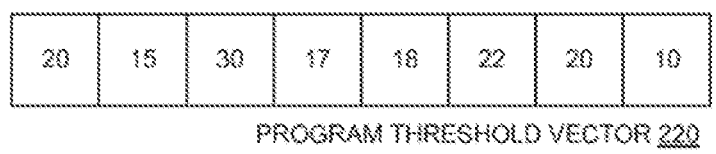
Figure 2:

FIG. 2 is an illustration of the physically unclonable program characteristics of a memory device, arranged in accordance with at least some embodiments described herein.

According to a diagram 200, an 8-bit word 210 (similar to 8-bit word 120 in FIG. 1) may include eight memory cells or bits 201-208. The bits 201-208 may each be associated with different program thresholds, for example due to the variations described above. For example, the bit 201 may have a program threshold of 20, the bit 202 may have a program threshold of 15, the bit 203 may have a program threshold of 30, and the bit 204 may have a program threshold of 17. The bit 205 may have a program threshold of 18, the bit 206 may have a program threshold of 22, the bit 207 may have a program threshold of 20, and the bit 208 may have a program threshold of 10. The program thresholds associated with each of the bit 201-208 may be represented by a "program threshold" vector 220.

The program thresholds associated with a set of bits such as the bits 201-208 may be characterized using a mean ($\alpha$) and a standard deviation ($\Delta$). For example, based on the example data in the vector 220, the $\alpha$ of the write thresholds of the bits 201-208 is 19, and the $\Delta$ is 5.78. In some embodiments, the $\alpha$ and $\Delta$ may be further used to group the bits 201-208 into a number of bins according to the bits' program threshold, as depicted by bit bin number vector 230. Bits that have program thresholds less than $\alpha-\Delta$ (about 13 program pulses according to the example data in this figure) may be assigned to a first bin (bin 1) and represented by a bin map. Only the bit 208 of the bits 201-208 falls into bin 1, and accordingly the bin map for bin 1 is "00000001", where the "1" value corresponds to the bit 208 at the end of the 8-bit word 210. Bits that have program thresholds greater than $\alpha-\Delta$ (about 13 program pulses according to this example) but less than $\alpha+\Delta$ (about 26 program pulses according to this example) may be assigned to a second bin (bin 2). The bits 201, 202, 204, 205, 206, and 207 fall into bin 2, and accordingly the bin map for bin 1 is "11011110", where the "1" values correspond to the bits 201, 202, 204, 205, 206, and 207. Bits that have program thresholds greater than $\alpha+\Delta$ (about 26 write pulses according to this example) may be assigned to a third bin (bin 3). Only the bit 203 falls into bin 3, and accordingly the bin map for bin 3 is "00100000", where the "1" value corresponds to the bit 203 in the third position of the 8-bit word 210. Organizing bits into different bins based on program thresholds may allow the selection of appropriate bits on which data should be encoded to take advantage of the additional security provided by the use of PUFs and partial program operations.

Figure 3:
FIG. 3 is an illustration of a first example of data being written to and recovered from a memory device with the knowledge of physically unclonable functions.

FIG. 3 is an illustration of a first example of data being written to and recovered from a memory device having PUFs, arranged in accordance with at least some embodiments described herein.

A diagram 300 illustrates how a word "00010001" may be written to the bits 201-208 having the program thresholds described in FIG. 2. A sender may wish to transmit the word "00010001" to a recipient. The sender may use a program module such as the program module 108 to partially program the word "00010001" to the initially-uncharged bits 201-208 by applying $\alpha-\Delta$ or 13 program pulses to the bits 204 and 208 and zero program pulses to the other bits 201-203 and 205-207. After the program pulses have been applied, a diagram 310 depicts the data values of the bits 201-208 in the upper row of blocks as well as the number of program pulses needed to change the bit data value (referred to as a "pulses-remaining value") in the lower row of blocks. Since the bits 201-203 and 205-207 have not had program pulses applied, their data values may remain at "0" and their pulses-remaining values may remain at their original write thresholds. Thirteen (13) program pulses were applied to the bits 204 and 208. The bit 204 had a program threshold of 17, and after the application of 13 write pulses now may have a pulses-remaining value of 4 (17−13=4). Because the number of applied program pulses is not enough to change the data value of the bit 204, the bit 204 remains at "0". The bit 208 had a program threshold of 10, and applying 13 program pulses may have been sufficient to change the data value of the bit 208. Accordingly, the data value of the bit 208 may now be "1", and the pulses-remaining value of the bit 208 may now be 0 (that is, no further pulses are needed to change the data value of the bit 208).

Subsequently, the sender may provide the physical memory containing the bits 201-208 to the recipient to which the word "00010001" is to be transmitted. The transfer of the physical memory may ensure that the recipient has access to the physical instantiation of the partial program operation of the word "00010001" on the bits 201-208. The recipient may use a program module similar to the program module 108 to perform a uniform or blind partial program operation on all of the bits 201-208 by applying 2$\Delta$ or 12 program pulses to each of the bits 201-208, resulting in the subsequent data values and pulses-remaining values of the bits 201-208 depicted in a diagram 320. In the diagram 320, the pulses-remaining values of each of the bits 201-208 may be decremented by 12 from their values in the diagram 310, and if the resulting pulses-remaining value is less than or equal to 0, then the corresponding bit may change its stored "digital" value. For example, the bit 204 had program pulses applied previously resulting in a pulses-remaining value of 4 as shown in the diagram 310. The application of 12 program pulses may be enough to reduce the pulses-remaining value of the bit 204 to less than 0, and as such the data value of the bit 204 may change to "1".

The recipient may then use the program module to perform another uniform or blind partial program operation on all of the bits 201-208 by applying another 2$\Delta$ or 12 program pulses to each of the bits 201-208, and a diagram 330 depicts the subsequent data values and pulses-remaining values of the bits 201-208. In the diagram 330, the pulses-remaining values of each of the bits 201-208 may be decremented by 12 from their values in the diagram 320, and if the resulting pulses-remaining value is less than or equal to 0, then the corresponding bit may change its stored "digital" value. As depicted, the bits 201, 202, 205, 206, and 207, all of which are categorized in bin 2, may now switch data values to "1", whereas the bit 203, which is categorized in bin 3, may still have a pulses-remaining value of 6 and therefore may remain at data value "0".

In some embodiments, after the first blind partial program operation of 2$\Delta$ program pulses the recipient may be able to retrieve the word "00010001" that was partially written. However, in the diagram 320 it may be difficult to determine whether (a) whether the bit 208 categorized in bin 1 was supposed to store a "0" or a "1", and (b) whether the bits with "0" values have "0" values because they are supposed to store "0" values or because they are in bin 3. For the latter situation, the second blind partial program operation of 2Δ may distinguish the bits belonging to bin 2 and the bits belonging to bin 3.

Figure 4:
FIG. 4 is an illustration of a second example of data being written to and recovered from a memory device by use of physically unclonable functions.

FIG. 4 is an illustration of a second example of data being written to and recovered from a memory device having PUFs, arranged in accordance with at least some embodiments described herein.

A diagram 400, similar to the diagram 300, illustrates how a word "10101010" may be written to the bits 201-208 having the program thresholds described in FIG. 2. A sender may wish to transmit the word "10101010" to a recipient. The sender may use a program module to partially write the word "10101010" to the initially-uncharged bits 201-208 by applying α–Δ or 13 program pulses to the bits 201, 203, 205, and 207 (all of which are in bin 2 except for the bit 203) and zero program pulses to the other bits 202, 204, 206, and 208. After the program pulses have been applied, a diagram 410 depicts that none of the bits 201-208 may have changed their "digital" values, although the pulses-remaining values associated with all of the bits to which program pulses have been applied have been decremented by 13.

Subsequently, the sender may provide the physical memory containing the bits 201-208 to the recipient. The recipient may then use a program module to perform a blind partial program operation on the bits 201-208 by applying 2Δ or 12 program pulses to each of the bits 201-208, resulting in the data values and pulses-remaining values depicted in a diagram 420. In the diagram 420, the bits 201, 205, and 207, which had partial programs applied previously, may all have changed values to "1". However, the bit 208, which was not written to previously, also changed values, whereas the bit 203, which had partial programs applied previously, may not change values. The program module may then apply another 2Δ or 12 program pulses to each of the bits 201-208, resulting in the data values and pulses-remaining values depicted in a diagram 430. In the diagram 430, all of the bits now may have changed values. In this example, the recipient without the PUF knowledge may not be able to fully retrieve the word "10101010" after the first blind partial program, both because the bit 203 (in bin 3), which should have stored a "1", may not have changed value, and the bit 208 (in bin 1), which should have stored a "0", did change value.

FIG. 5 is an illustration of a third example of data being written to and recovered from a memory device having PUFs, arranged in accordance with at least some embodiments described herein.

A diagram 500, similar to the diagrams 300 and 400, illustrates how a word "11111111" may be written to the bits 201-208 having the program pulses parameters described in FIG. 2. A sender may wish to transmit the word "11111111" to a recipient. The sender may use a program module to partially write the word "11111111" to the bits 201-208 by applying α–Δ or 13 program pulses to each of the bits 201-208. As depicted in a diagram 510, after the program pulses have been applied to the bits 201-208 the bit 208 (categorized in bin 1) may change value to "1" while the other bits 201-207 may not change value, although the pulse-remaining values associated with the bits 201-207 may decrease.

Subsequently, the sender may provide the physical memory containing the bits 201-208 to recipient to which the word "11111111" is to be transmitted. The recipient may then use a program module to perform a blind partial program operation on the bits 201-208 by applying 2Δ or 12 program pulses to each of the bits 201-208, resulting in the data values and pulses-remaining values depicted in a diagram 520. In the diagram 520, all of the bits except for the bit 203 may have changed values. The program module may then apply another 2Δ or 12 program pulses to each of the bits 201-208, resulting in the data values and pulses-remaining values depicted in a diagram 530. In the diagram 530, all of the bits now may have changed their "digital" values. In this example, the recipient without the PUF knowledge may not be able to fully retrieve the word "11111111" after the first blind partial program, because the bit 203 (in bin 3), which should have stored a "1", may not have changed value.

Figure 6:
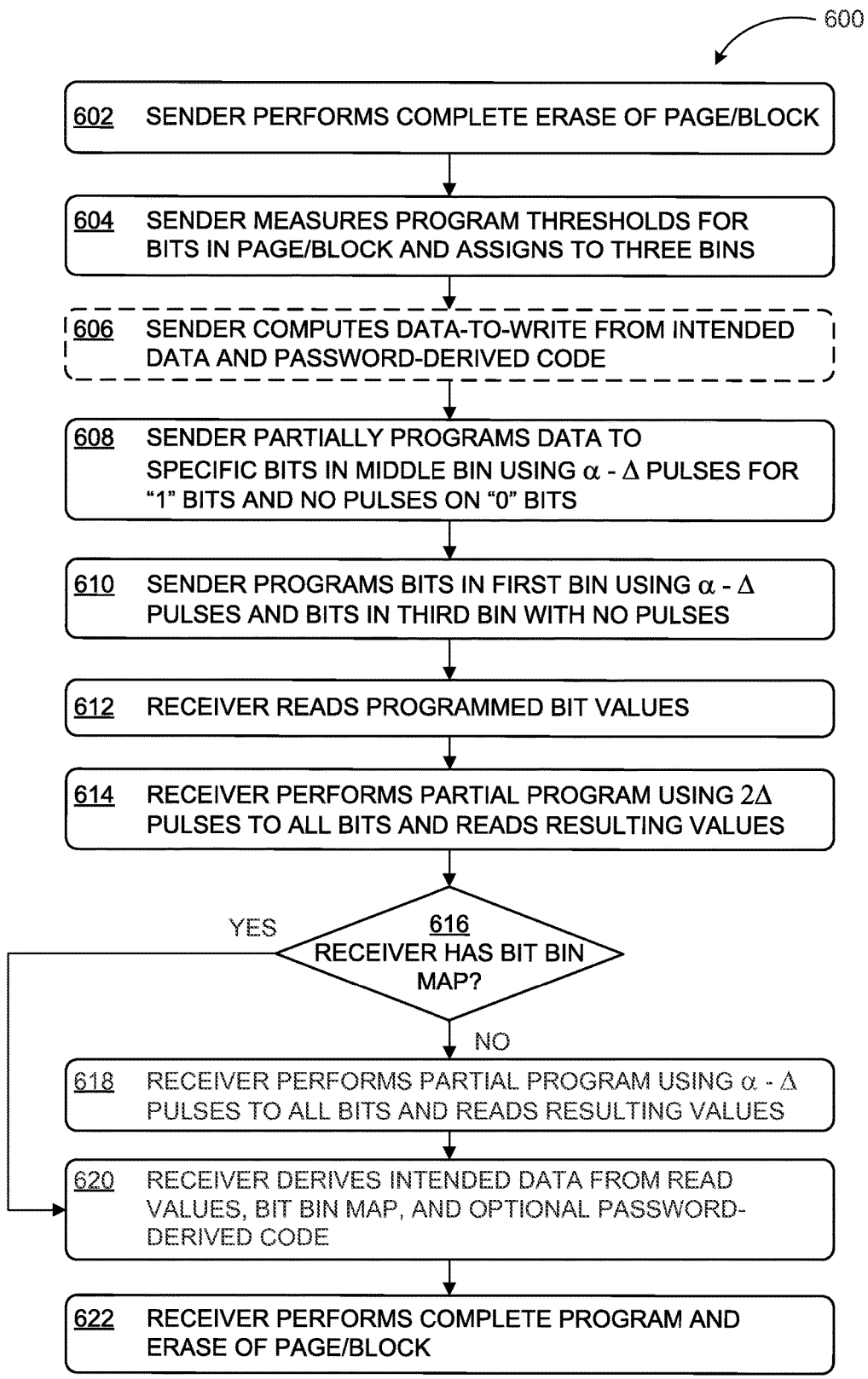
FIG. 6 is an illustration of a first example process for programming and recovering data on a memory device using partial program cycles as PUFs.

FIG. 6 is an illustration of a first example process 600 for programming and recovering data on a memory device having PUFs using partial programming, arranged in accordance with at least some embodiments described herein. Process 600 may include one or more operations, functions, or actions as illustrated by one or more of blocks 602-618. Although some of the blocks in process 600 (as well as in any other process/method disclosed herein) are illustrated in a sequential order, these blocks may also be performed in parallel and/or in a different order than those described herein. Also, the various blocks may be combined into fewer blocks, divided into additional blocks, and/or eliminated based upon the particular implementation. Additional blocks representing other operations, functions, or actions may be provided.

According to process 600, programming and recovering data on a memory device having PUFs using partial programming may begin at block 602 ("Sender performs complete erase of page/block"), where a sender who wishes to transmit data to a receiver using a memory device may completely erase the portion of the memory device that will store the data to be transmitted. At block 604 ("Sender measures program thresholds for bits in page/block and assigns to three bins"), which may follow block 602, the sender may measure the program thresholds for each bit in the completely-erased memory portion. In some embodiments, the sender may perform the measurement by using a program module such as the program module 108 to apply program pulses to each bit until the data value stored at the bit changes. After measuring the program thresholds, the sender may record them and group the bits in the memory portion into three bins, as described above. In other embodiments, the sender may group the bits into more or fewer bins. In some embodiments, only memory that have α>3Δ may be used if the bit bin maps are not distributed to potential receivers. After measuring the program thresholds, the sender may again perform a complete erase of the memory portion.

At optional block 606 ("Sender computes data-to-write from intended data and password-derived code"), which may follow block 604, the sender may use a password-derived code to compute the data to be written on the memory. In some embodiments, the sender may compute the data by combining an intended data with the password-derived code using a bitwise AND, XOR or XNOR functions.

At block 608 ("Sender partially programs data to specific bits in middle bin using α–Δ pulses for '1' bits and no pulses on '0' bits"), which may follow block 606, the sender may use the program module to apply α–Δ program pulses to bits in the middle bin (that is, bits with program thresholds between α–Δ and α+Δ) based on the data to be transmitted to the recipient. For example, the sender may use a key mask or some other method to select the bits in the middle bin onto which the data is to be partially programmed. The sender may then partially program the selected bits with the data by applying α–Δ program pulses to bits in the selected bits that are to store "1" values and no pulses to bits in the selected bits that are to store "0" values. Because the selected bits are in the middle bin, even the bits partially programmed with program pulses may not appear to store "1" values when read without the PUF knowledge. At block 610 ("Sender programs bits in first bin using α–Δ pulses and bits in third bin with no pulses"), which may follow block 608, the sender may then program bits in the first bin (that is, the bits with program thresholds less than α–Δ) with α–Δ program pulses, assuring that those bits will appear to store "1" values when read. The sender may not program or partially program bits in the third bin (that is, the bits with program thresholds greater than α+Δ). In some embodiments, the sender may further obscure the partially-programmed bits by randomly inserting "0" and "1" bits according to a key mask generated using a password or other cryptographic value. The sender may then provide the partially-programmed memory to the receiver. In some embodiments, the sender may also provide the key mask to the receiver along with the partially-programmed memory, or may provide the key mask to the receiver before or after providing the partially-programmed memory.

At block 612 ("Receiver reads programmed bit values"), which may follow block 610, the receiver in possession of the partially-programmed memory may first use a read module (for example, the read module 106) to read the data values of the partially-programmed memory bits. At this point, bits belonging to the first bin may read the digital value of "1", bits belonging to the third bin may read "0", and bits belonging to the middle bin may mostly read "0". If the receiver also possesses the bit bin map (as described above), then the receiver may use the bit bin map and the initially-read values to determine whether the memory is actually the authentic partially-programmed memory or a fake. For example, if the bit bin map indicates that a particular bit belongs to the first bin, but the value read from that bit in the memory is "0", then the receiver may know that the memory is fake.

At block 614 ("Receiver performs partial program using 2Δ pulses to all bits and reads resulting values"), which may follow block 612, the receiver may use a program module such as the program module 108 to perform a blind partial program operation by applying 2Δ program pulses to each of the bits in the memory, as described above, and record the resulting bit values. After the blind partial program operation, the bits in the middle bin selected to store the digital "1" data values (for example, based on the key mask) may change values from "0" to "1" to the reader. However, the bits in the middle bin selected to store "0" data values, as well as the bits in the third bin, may not have received sufficient program pulses to change the digital values. In some embodiments, the receiver is not able to distinguish between the bits in the middle bin storing "0" data values and the bits in the third bin if the receiver does not have the bin map for the received memory.

At block 616 ("Receiver has bit bin map?"), which may follow block 614, the receiver may determine whether it possesses a bin map for the received memory. If not, then the receiver may not yet be able to distinguish the bits in the middle bin that hold "0" data values from bits in the third bin that do not hold data values. Accordingly, at block 618 ("Receiver performs partial program using α–Δ pulses to all bits and reads resulting values"), which may follow block 616, the receiver may use the program module to perform an additional blind partial program by applying α–Δ program pulses to each bit in the memory and then record the resulting bit values. At this point, any bits that change value may be the "0" bits in the middle bin, and any bits that do not change value may be bits belonging to the third bin. At this point, the receiver may be able to determine the complete bit bin map and retrieve the data from the memory. On the other hand, if at block 616 the receiver determines that it does possess a bin map for the received memory, then the receiver may use the bin map to distinguish "0" bits in the middle bin from bits in the third bin after block 612, and may not need to perform block 618.

In either case, at block 620 ("Receiver derives intended data from read values, bit bin map, and optional password-derived code"), which may follow block 616 and/or block 618, the receiver may derive the intended data using the values read in blocks 612, 614, 618, the bit bin map, and/or the optional password-derived code if block 606 was performed.

At block 622 ("Receiver performs complete program and erase of page/block"), which may follow block 620, the receiver may use the program module to perform a complete program and erase of the memory storing the data in order to prepare the memory for further use.

Figure 7:
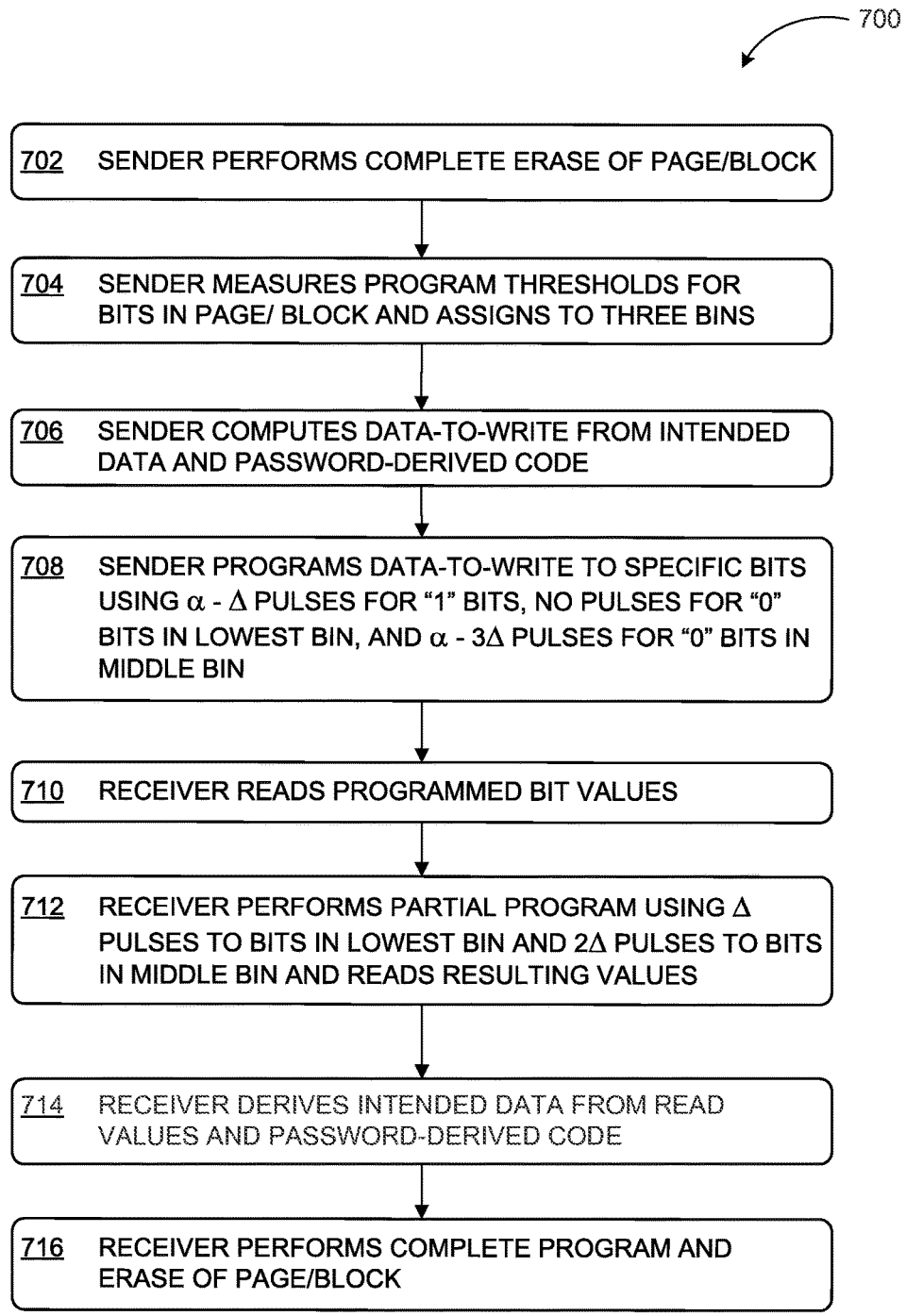
FIG. 7 is an illustration of a second example process for programming and recovering data on a memory device using partial program cycles as PUFs.

FIG. 7 is an illustration of a second example process 700 for programming and recovering data on a memory device having PUFs using partial programming, arranged in accordance with at least some embodiments described herein. Process 700 may include one or more operations, functions, or actions as illustrated by one or more of blocks 702-716. Although some of the blocks in process 700 are illustrated in a sequential order, these blocks may also be performed in parallel and/or in a different order than those described herein. Also, the various blocks may be combined into fewer blocks, divided into additional blocks, and/or eliminated based upon the particular implementation. Additional blocks representing other operations, functions, or actions may be provided.

According to process 700, programming and recovering data on a memory device having PUFs using partial programming may begin at block 702 ("Sender performs complete erase of page/block"), which may be similar to block 602 in process 600. At block 704 ("Sender measures program thresholds for bits in page/block and assigns to three bins"), which may follow block 702 and may be similar to block 604 in process 600, the sender may measure the program thresholds for each bit in the memory portion erased at block 702 and assign each bit to one of three bins.

At block 706 ("Sender computes data-to-write from intended data and password-derived code"), which may follow block 704, the sender may use a password-derived code to compute the data to be written on the memory, similar to block 606. In some embodiments, the sender may compute the data by combining an intended data with the password-derived code using a bitwise XOR or XNOR function.

At block 708 ("Sender programs data-to-write to specific bits using α–Δ pulses for '1' bits, no pulses for '0' bits in lowest bin, and α–3Δ pulses for '0' bits in middle bin"), which may follow block 706, the sender may use the program module to apply program pulses to bits based on the data-to-write. For example, the sender may first use a key mask or some other method to select the bits onto which the data is to be partially programmed. In some embodiments, bits across two or more of the three bins may be selected for the data. The sender may partially program the selected bits with the data by applying α–Δ program pulses to bits in the selected bits that are to store digital "1" values. The sender may then partially program bits in the selected bits that (a)

are to store "0" data values and (b) are in the lowest bin (that is, the bits with write thresholds less than α−Δ) with no program pulses, and may then partially program bits in the selected bits that (a) are to store "0" and (b) are in the middle bin with α−3Δ program pulses. The sender may then provide the partially-programmed memory to the receiver.

At block 710 ("Receiver reads programmed bit values"), which may follow block 708, the reader in possession of the partially-programmed memory may use a read module (for example, the read module 106) to read and record the data values of the partially-programmed memory bits. At block 712 ("Receiver performs partial program using Δ pulses to bits in lowest bin and 2Δ pulses to bits in middle bin and reads resulting values"), which may follow block 710, the receiver, who is also in possession of both the bit bin map and the password-derived code, performs a partial program of the memory using a program module (for example, the program module 108). First, the receiver may use the bit bin map to identify bits in the lowest bin, bits in the middle bin, and bits in the highest bin. Second, the receiver may use the program module to apply Δ pulses to each bit in the lowest bin and 2Δ pulses to each bit in the middle bin. The reader may then read and record the data values of the bits in the lowest and middle bins.

At block 714 ("Receiver derives intended data from read values and password-derived code"), which may follow block 712, the receiver may use the password-derived code and the data values read in blocks 710 and 712 to derive the intended data. For example, the receiver may first derive the data-to-write based on the bit bin map and the data values read in blocks 710 and 712. Bits in the lowest bin that store "1" data values may already read "1" at block 710, and bits in the lowest bin that store "0" data values may read "0" at block 714. Bits in the middle bin that store "1" data values may already read "1" at block 710, and bits in the middle bin that store "0" data values may read "0" at block 710 and "1" at block 714. Bits in the highest bin may be used to determine whether the memory is actually the authentic partially-programmed memory or a fake, as described above in process 600.

At block 716 ("Receiver performs complete program and erase of page/block"), which may follow block 714, the receiver may use the program module to perform a complete program and erase of the memory storing the data in order to prepare the memory for further use.

In process 700, an attacker with no prior knowledge of the bit bin map may not be able to distinguish between bits in different bins. As a result, the attacker may only be able to apply the same number of program pulses to every bit. If the number of program pulses applied is too few, the data in the middle bin may be wrong. On the other hand, if the number of write pulses applied is too many, the data in the lowest bin may be wrong. Moreover, progressive application of program pulses may confuse the data readout between "0" and "1" values. Any attempts by the attacker to obtain the bit bin map from the physical memory may result in destroying the data.

Example embodiments discussed above may provide some data security against attackers, because an attacker must have the physical memory, the password or key mask used to partially program the data onto the memory, and possibly also the bit bin map. Merely copying the digital values (that is, "0" or "1") of the memory bits may be useless, because the application of specific program pulses may be needed to recover the intended data. Merely having the physical memory without knowledge of the password/key mask or the bit bin mask may also be useless to an attacker, because the attacker may not know how to apply the specific program pulses to recover the intended data. It may be nearly impossible for the attacker due to computational cost to try to recover the data without the password or key mask.

The example embodiments discussed above may also provide memory tamper detection. If a receiver has the bit bin map for a physical memory, the receiver may be able to determine whether the bits in the physical memory actually correspond to the bit bin map. The receiver may also be able to determine whether bits that should not have changed values have in fact changed values (for example, due to attempted partial programming by an attacker). In some embodiments, additional security may be provided by preventing any reader of the memory, including the receiver, from being able to erase the physical memory. Thus, the reading operation may be performed only one time, and the data may be guaranteed to be destroyed by having every bit read as digital "1".

Secure data storage based on physically unclonable functions and partial program operations as described herein may be modified in several ways. In one embodiment, multiple copies of an intended data, each written into different memories or memory portions, may be provided to avoid data loss due to accidental use of the wrong password. In this embodiment, the apparent data content for the intended data may differ across the different memories due to the physical differences between the different memories. In other embodiments, error correction codes may be employed to assist in data retrieval and to account for age-based bit decay or fluctuation. In some embodiments, partial erase operations may be used to encode data into physical memory in addition to or instead of partial program operations. If memory bits are not categorized into three bins, the Hamming distance associated with different encodings may be calculated to provide sufficient separation between an authentic reader from an attacker by correlation functions.

Figure 8:
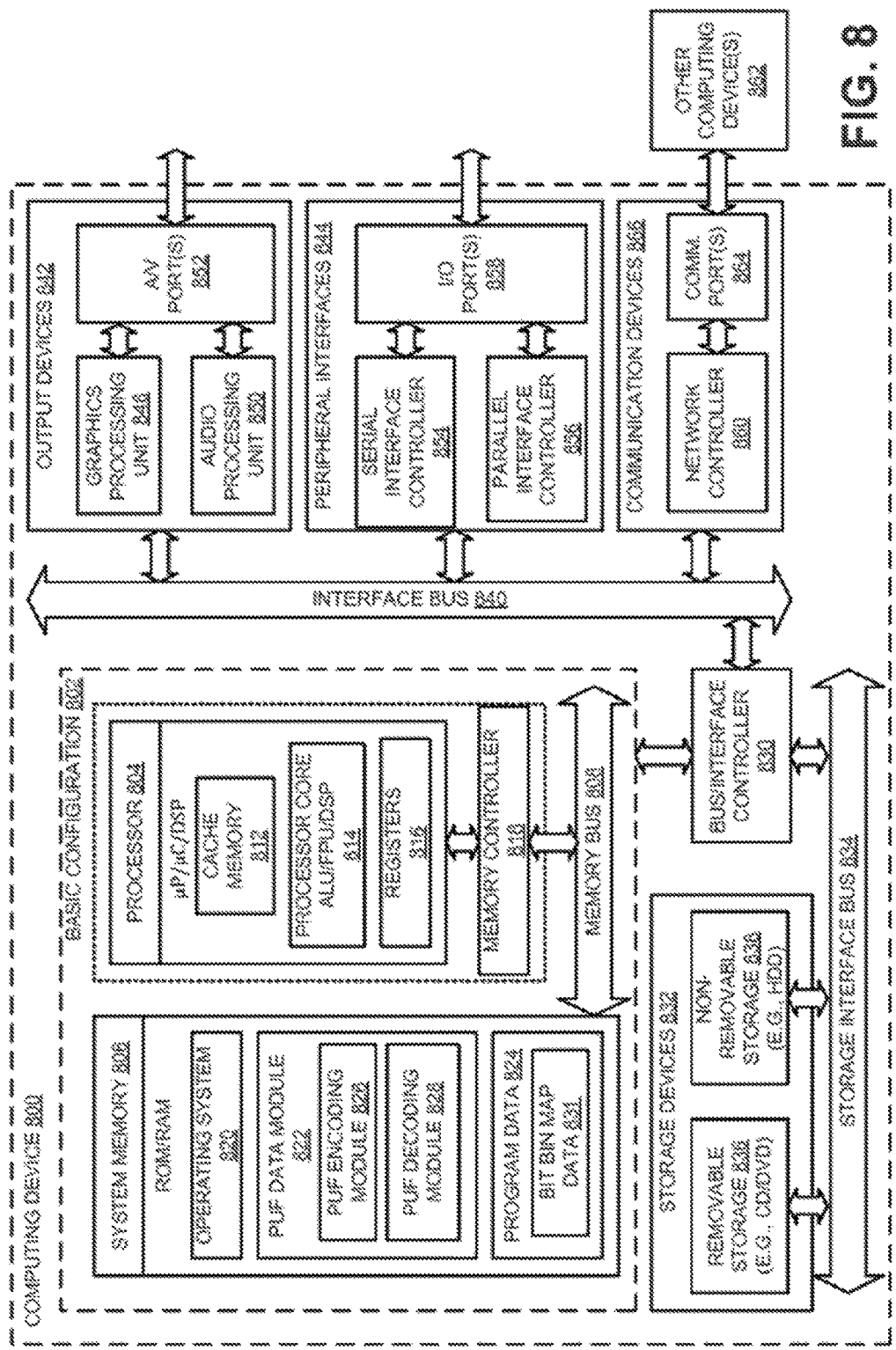
FIG. 8 is an illustration of a general purpose computing device, which may be used to provide secure data storage based on physically unclonable functions.

FIG. 8 is an illustration of a general purpose computing device, which may be used to provide secure data storage based on physically unclonable functions, arranged in accordance with at least some embodiments described herein.

For example, the computing device 800 may be used to write or read data using physically unclonable functions and partial program operations as described herein. In an example basic configuration 802, the computing device 800 may include one or more processors 804 and a system memory 806. A memory bus 808 may be used to communicate between the processor 804 and the system memory 806. The basic configuration 802 is illustrated in FIG. 8 by those components within the inner dashed line.

Depending on the desired configuration, the processor 804 may be of any type, including but not limited to a microprocessor (μP), a microcontroller (μC), a digital signal processor (DSP), or any combination thereof. The processor 804 may include one more levels of caching, such as a cache memory 812, a processor core 814, and registers 816. The example processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a physically unclonable function (PUF) data module 822, and program data 824. The PUF data module 822 may include a PUF encoding module 826 and a PUF decoding module 828 to implement secure data storage and transfer using PUFs as described herein. The program data 824 may include, among other data, bit bin map data 831 or the like, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., one or more output devices 842, one or more peripheral interfaces 844, and one or more communication devices 866) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 includes a network controller 860, which may be arranged to facilitate communications with one or more other computing devices 862 over a network communication link via one or more communication ports 864. The one or more other computing devices 862 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Figure 9:
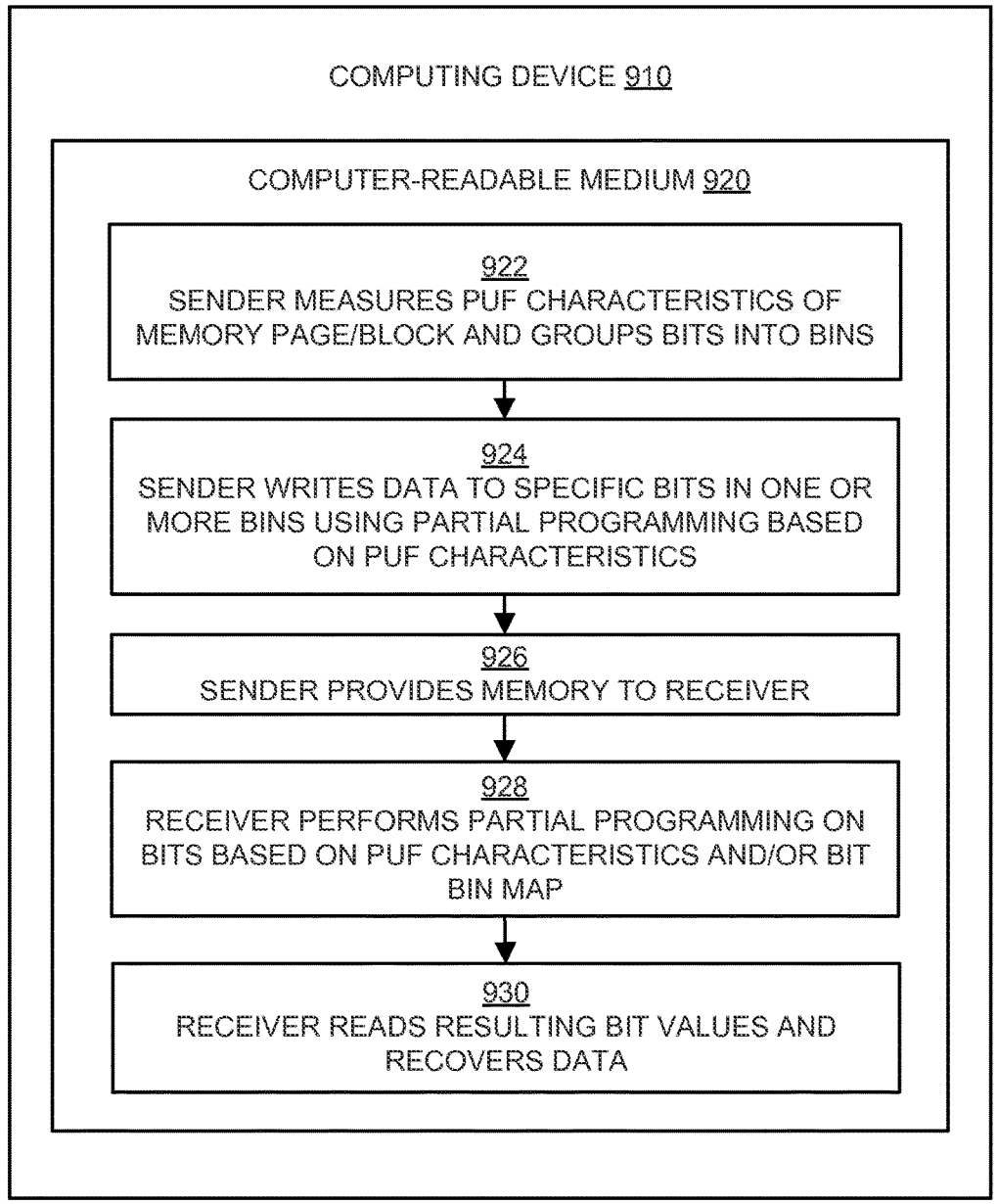
FIG. 9 is a flow diagram illustrating an example method for providing secure data storage based on physically unclonable functions that may be performed by a computing device such as the computing device in FIG. 8.

FIG. 9 is a flow diagram illustrating an example method for providing secure data storage based on physically unclonable functions that may be performed by a computing device such as the computing device in FIG. 8, arranged in accordance with at least some embodiments described herein.

Example methods may include one or more operations, functions or actions as illustrated by one or more of blocks 922, 924, 926, 928, and/or 928, and may in some embodiments be performed by a computing device such as the computing device 900 in FIG. 9. The operations described in the blocks 922-928 may also be performed in response to execution (by one or more processors) of computer-executable instructions stored in a computer-readable medium such as a non-transitory computer-readable medium 920 of a computing device 910. Computing device 910 may be embodied by computing device 800 of FIG. 8.

An example process to provide secure data storage based on physically unclonable functions may begin with block 922, "SENDER MEASURES PUF CHARACTERISTICS OF MEMORY PAGE/BLOCK AND GROUPS BITS INTO BINS", where a sender who wishes to send data to a receiver may measure physically unclonable function (PUF) characteristics associated with bits in a physical memory page, block, or section, and use the measured characteristics to group the bits. For example, the sender may measure a program threshold average and a program threshold variation associated with the bits and use the measured average and variation to group the bits into three bins, as described above.

Block 922 may be followed by block 924, "SENDER WRITES DATA TO SPECIFIC BITS IN ONE OR MORE BINS USING PARTIAL PROGRAMMING BASED ON PUF CHARACTERISTICS", where the sender may select a set of bits from one or more bins and partially program data to the selected bits. In some embodiments, the sender may select the set of bits using a key mask or from multiple bins, as described above. The sender may partially program the data to the selected bits by applying write pulses based on the PUF characteristics (for example, the program threshold average and the program threshold variation) measured in block 922.

Block 924 may be followed by block 926, "SENDER PROVIDES MEMORY TO RECEIVER", where the sender provides the partially-programmed physical memory to a receiver.

Block 926 may be followed by block 928, "RECEIVER PERFORMS PARTIAL PROGRAMMING ON BITS BASED ON PUF CHARACTERISTICS AND/OR BIT BIN MAP", where the receiver partially programs the bits in the received physical memory, as described above. In some embodiments, the receiver may know the PUF characteristics of the physical memory as well as a bit bin map relating the bits in the physical memory to their corresponding bin. The receiver may then use this information to select the bits to partially program as well as the number of write pulses to use for the partial programming, and may then partially program the selected bits, as described above.

Block 928 may be followed by block 930, "RECEIVER READS RESULTING BIT VALUES AND RECOVERS DATA", where the receiver may read the bit data values on the memory before and/or after partial programming and use the read data to recover the actual data, as described above. In some embodiments, the receiver may use a password-derived code to recover the bit data values on the memory, as described above.

Figure 10:
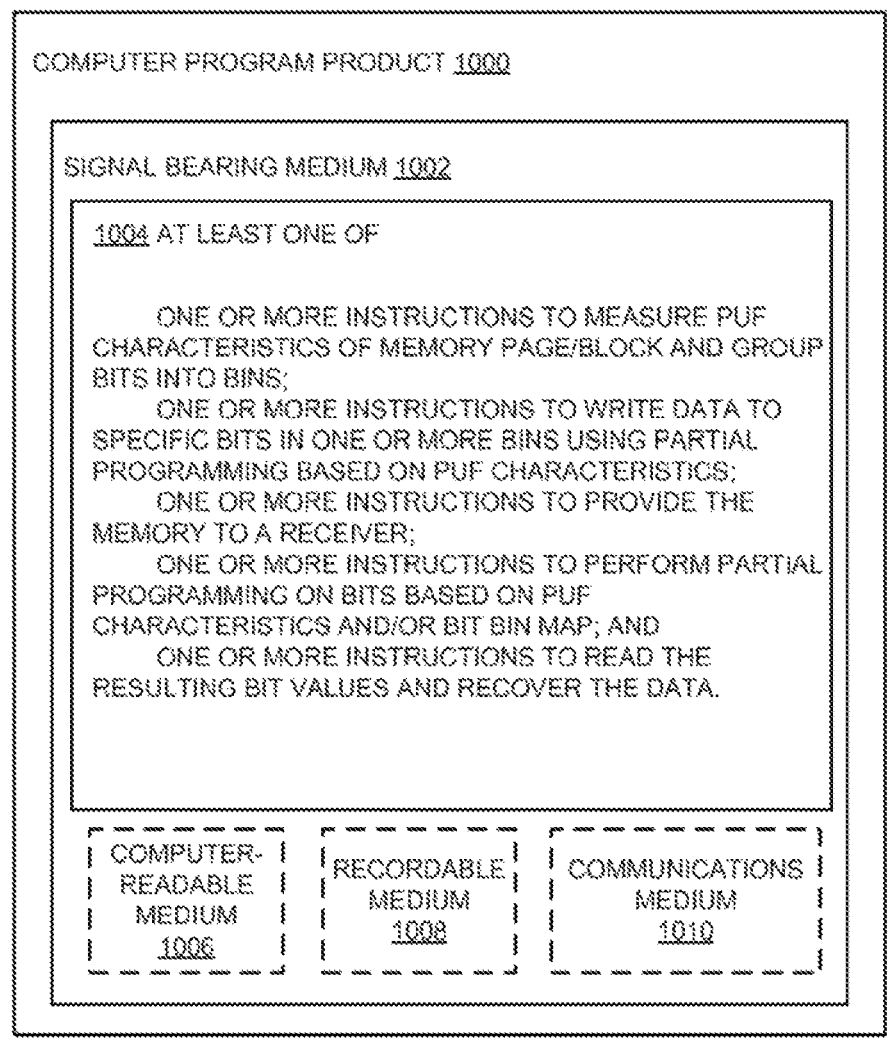
FIG. 10 is an illustration of a block diagram of an example computer program product, all arranged in accordance with at least some embodiments described herein.

FIG. 10 is an illustration of a block diagram of an example computer program product, arranged in accordance with at least some embodiments described herein.

In some examples, as shown in FIG. 10, a computer program product 1000 may include a signal bearing medium 1002 that may also include one or more machine readable instructions 1004 that, in response to execution by, for example, a processor may provide the functionality and features described herein. Thus, for example, referring to the processor 804 in FIG. 8, the PUF data module 822 may undertake one or more of the tasks shown in FIG. 10 in response to the instructions 1004 conveyed to the processor 804 by the signal bearing medium 1002 to perform actions associated data storage and transfer using PUFs as described herein. Some of those instructions may include, for example, instructions to measure PUF characteristics of a memory page/block and group bits into bins, write data to specific bits in one or more bins using partial programming based on PUF characteristics, provide the memory to a receiver, perform partial programming on bits based on PUF characteristics and/or a bin bit map, and/or read the resulting bit values and recover the data, according to some embodiments described herein.

In some implementations, the signal bearing medium 1002 depicted in FIG. 10 may encompass computer-readable medium 1006, such as, but not limited to, a hard disk drive (HDD), a solid state drive (SSD), a Compact Disc (CD), a Digital Versatile Disk (DVD), a digital tape, memory, etc. In some implementations, the signal bearing medium 1002 may encompass recordable medium 1008, such as, but not limited to, memory, read/write (R/W) CDs, R/W DVDs, etc. In some implementations, the signal bearing medium 1002 may encompass communications medium 1010, such as, but not limited to, a digital and/or an analog communication medium (e.g., a fiber optic cable, a waveguide, a wired communications link, a wireless communication link, etc.). Thus, for example, the computer program product 1000 may be conveyed to one or more modules of the processor 704 by an RF signal bearing medium, where the signal bearing medium 1002 is conveyed by the wireless communications medium 1010 (e.g., a wireless communications medium conforming with the IEEE 802.11 standard).

According to some examples, a method is provided to write data on a nonvolatile memory using a physically unclonable function. The method may include determining, for multiple memory bits on the nonvolatile memory, a program threshold average and a program threshold variation. The method may further include deriving, based on the program threshold average and the program threshold variation, a first bin threshold and a second bin threshold, and grouping the bits into at least a first bit group, a second bit group, and a third bit group, based on at least the first bin threshold and the second bin threshold. The method may further include determining, based on at least the grouping of the bits, a set of bits to which the data is to be written, and performing a partial program of the data to the set of bits based on the program threshold average and the program threshold variation.

According to some embodiments, the program threshold may represent a number of program pulses to modify a bit in the multiple bits from a first value to a second value. Grouping the multiple bits may include determining a respective program threshold for each bit in the multiple bits and assigning each bit in the multiple bits having a respective program threshold less than the first bin threshold to the first bit group. Grouping the multiple bits may further include assigning each bit in the multiple bits having a respective program threshold greater than the first bin threshold and less than the second bin threshold to the second bit group and assigning each bit in the multiple bits having a respective program threshold greater than the second bin threshold to the third bit group.

According to other embodiments, grouping the multiple bits may further include generating a bit bin map based on the grouping. The first bin threshold may be derived by subtracting the program threshold variation from the program threshold average and the second bin threshold may be derived by adding the program threshold variation to the program threshold average. Determining the set of bits to which the data is to be written may further include selecting the set of bits from the second bit group. Determining the set of bits to which the data is to be written may be based on a key mask and/or the grouping of the plurality of bits. The method may further include deriving the data to be written from a password-derived value and an intended data value. Deriving the data to be written may include inserting random bit values into positions of an intended data indicated by a key mask.

According to further embodiments, performing the partial program of the data may further include writing a bit value of "1" in the data to bits in the set of bits using a number of program pulses equal to the first bin threshold and writing a bit value of "0" in the data to bits in the set of bits using zero program pulses. Performing the partial program of the data may further include writing a bit value of "1" in the data to bits in the set of bits using a number of program pulses equal to the first bin threshold, writing a bit value of "0" in the data to bits in the set of bits belonging to the second bit group using zero program pulses, and writing a bit value of "0" in the data to bits in the set of bits belonging to the third bit group using a number of program pulses equal to a third threshold.

According to other examples, an encoding module is provided to write data on a nonvolatile memory using a physically unclonable function. The encoding module may include an interface configured to couple to multiple memory bits on the nonvolatile memory and a processor block. The processor block may be configured to determine, for the multiple memory bits, a program threshold average and a program threshold variation. The processor block may be further configured to derive, from the program threshold average and the program threshold variation, a first bin threshold and a second bin threshold, and group the multiple bits into at least a first bit group, a second bit group, and a third bit group, based on at least the first bin threshold and the second bin threshold. The processor block may be further configured to determine, based on at least the grouping of the bits and a key mask, a set of bits to which the data is to be written, and performing a partial program of the data to the set of bits based on the write threshold average and the program threshold variation.

According to some embodiments, the processor block may be further configured to group the multiple bits by determining a respective program threshold for each bit in the multiple bits and assigning each bit in the multiple bits having a respective program threshold less than the first bin threshold to the first bit group. The processor block may be further configured to group the multiple bits by assigning each bit in the multiple bits having a respective program threshold greater than the first bin threshold and less than the second bin threshold to the second bit group and by assigning each bit in the multiple bits having a respective program threshold greater than the second bin threshold to the third bit group. The processor block may be configured to group the multiple bits by generating a bit bin map based on the grouping.

According to other embodiments, the processor block is configured to derive the first bin threshold by subtracting the program threshold variation from the program threshold average and derive the second bin threshold by adding the program threshold variation to the program threshold average. The processor block may be configured to determine the set of bits to which the data is to be written by selecting the set of bits from the second bit group. The processor block may be further configured to derive the data to be written from a password-derived value and an intended data value. The processor block may be further configured to derive the data to be written by inserting random bit values into positions of an intended data indicated by the key mask to form the data to be written.

According to further embodiments, the processor block may be configured to perform the partial program of the data by writing a bit value of "1" in the data to bits in the set of bits using a number of program pulses equal to the first bin threshold and writing a bit value of "0" in the data to bits in the set of bits using zero program pulses. The processor block may be configured to perform the partial program of the data by writing a bit value of "1" in the data to bits in the set of bits using a number of program pulses equal to the first bin threshold, writing a bit value of "0" in the data to bits in the set of bits belonging to the second bit group using zero program pulses, and writing a bit value of "0" in the data to bits in the set of bits belonging to the third bit group using a number of program pulses equal to a third threshold.

According to further examples, a method is provided to read data from a nonvolatile memory using a physically unclonable function. The method may include applying at least one program pulse to at least one bit in multiple memory bits in the nonvolatile memory based on a program threshold average, a program threshold variation, and/or a bit group characterization associated with the at least one bit. The method may further include reading a resulting state of the multiple memory bits and deriving a final data based on the resulting state and another data value.

According to some embodiments, the method may include reading an initial state for the multiple memory bits, and deriving the final data may include deriving the final data based on at least the resulting state and the initial state. The method may include deriving a first program parameter from the program threshold average and the program threshold variation, and applying the at least one program pulse may include applying a number of program pulses equal to the first program parameter to every bit in the multiple memory bits. The method may further include deriving a second program parameter from the program threshold average and the program threshold variation, again applying a number of program pulses equal to the second program parameter to every bit in the multiple memory bits, and reading another state of the multiple memory bits, where deriving the final data includes deriving the final data based on at least the resulting state, the initial state, and the other state.

According to other embodiments, the method may include grouping the multiple memory bits into a first bit group, a second bit group, and a third bit group based on the bit group characterization and deriving a first program parameter and a third program parameter from the program threshold average and the program threshold variation. Applying the at least one program pulse may further include applying a number of program pulses equal to the first program parameter to bits in the multiple memory bits in the second bit group and applying a number of program pulses equal to the third program parameter to bits in the multiple memory bits in the first bit group. The other data value may be a password-derived value and/or a key mask. The method may further include authenticating the multiple memory bits based on a bit bin map and/or recovering a bit bin map based on the resulting state.

According to yet further examples, a decoding module is provided to read data from a nonvolatile memory using a physically unclonable function. The decoding module may include an interface configured to couple to multiple memory bits in the nonvolatile memory and a processor block. The processor block may be configured to apply at least one program pulse to one or more bits in the multiple memory bits based on a program threshold average, a program threshold variation, and/or a bit group characterization associated with the bit(s), where the program threshold may represent a number of program pulses to modify a bit in the memory bits from a first value to a second value. The processor block may be further configured to read a resulting state of the multiple memory bits and derive a final data based on the resulting state and another data value.

According to some embodiments, the processor block may be further configured to read an initial state for the multiple memory bits and derive the final data based on at least the resulting state and the initial state. The processor block may be further configured to derive a first program parameter from the program threshold average and the program threshold variation and apply the at least one program pulse by applying a number of program pulses equal to the first program parameter to every bit in the multiple memory bits. The processor block may be further configured to derive a second program parameter from the program threshold average and the program threshold variation, again apply a number of program pulses equal to the second program parameter to every bit in the multiple memory bits, read another state of the multiple memory bits, and derive the final data based on at least the resulting state, the initial state, and the other state.

According to other embodiments, the processor block may be further configured to group the multiple memory bits into a first bit group, a second bit group, and a third bit group based on the bit group characterization and derive a first program parameter and a third program parameter from the program threshold average and the program threshold variation. The processor block may be further configured to apply at least one program pulse by applying a number of program pulses equal to the first program parameter to bits in the multiple memory bits in the second bit group and applying a number of program pulses equal to the third program parameter to bits in the multiple memory bits in the first bit group. The other data value may be a password-derived value. The processor block may be further configured to authenticate the multiple memory bits based on a bit bin map and/or recover a bit bin map based on the resulting state.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to write data on a nonvolatile memory using a physically unclonable function, the method comprising:
    determining, for a plurality of memory bits on the nonvolatile memory, a program threshold average and a program threshold variation;
    deriving, based on the program threshold average and the program threshold variation, a first bin threshold and a second bin threshold;
    grouping the plurality of memory bits into at least a first bit group, a second bit group, and a third bit group, based on at least the first bin threshold and the second bin threshold;
    determining, based on at least the grouping of the plurality of memory bits, a set of bits to which the data is to be written; and
    performing a partial program of the data to the set of bits based on the program threshold average and the program threshold variation.

2. The method of claim 1, wherein the program threshold average and the program threshold variation represent a number of program pulses to modify a bit in the plurality of memory bits from a first value to a second value.

3. The method of claim 1, wherein grouping the plurality of memory bits comprises:
    determining a respective program threshold for each bit in the plurality of memory bits;
    assigning each bit in the plurality of memory bits having a respective program threshold less than the first bin threshold to the first bit group;
    assigning each bit in the plurality of memory bits having a respective program threshold greater than the first bin threshold and less than the second bin threshold to the second bit group; and
    assigning each bit in the plurality of memory bits having a respective program threshold greater than the second bin threshold to the third bit group.

4. The method of claim 1, wherein determining the set of bits to which the data is to be written is based on at least a key mask and/or the grouping of the plurality of memory bits.

5. The method of claim 1, further comprising deriving the data to be written from a password-derived value and an intended data value by inserting random bit values into positions of an intended data indicated by a key mask.

6. The method of claim 1, wherein performing the partial program of the data comprises:
    writing a bit value of "1" in the data to bits in the set of bits using a number of program pulses equal to the first bin threshold; and
    writing a bit value of "0" in the data to bits in the set of bits using zero program pulses.

7. The method of claim 1, wherein performing the partial program of the data comprises:
    writing a bit value of "1" in the data to bits in the set of bits using a number of program pulses equal to the first bin threshold;
    writing a bit value of "0" in the data to bits in the set of bits belonging to the second bit group using zero program pulses; and
    writing a bit value of "0" in the data to bits in the set of bits belonging to the third bit group using a number of program pulses equal to a third bin threshold.

8. An apparatus, comprising:
    an encoder module configured to write data on a nonvolatile memory by use of a physically unclonable function;

an interface configured to couple to a plurality of memory bits on the nonvolatile memory; and a processor coupled to the interface and the encoder module, the processor configured to operate with the interface and the encoder module to:

determine, for the plurality of memory bits, a program threshold average and a program threshold variation;

derive, from the program threshold average and the program threshold variation, a first bin threshold and a second bin threshold;

group the plurality of memory bits into at least a first bit group, a second bit group, and a third bit group, based on at least the first bin threshold and the second bin threshold;

determine, based on at least the grouping of the plurality of memory bits and to key mask, a set of bits to which the data is to be written; and perform a partial program of the data to the set of bits based on the program threshold average and the program threshold variation.

9. The apparatus of claim 8, wherein to group the plurality of memory bits, the processor is configured to:

determine a respective program threshold for each bit in the plurality of memory bits;

assign each bit in the plurality of memory bits having a respective program threshold less than the first bin threshold to the first bit group;

assign each bit in the plurality of memory bits having a respective program threshold greater than the first bin threshold and less than the second bin threshold to the second bit group; and assign each bit in the plurality of memory bits having a respective program threshold greater than the second bin threshold to the third bit group.

10. The apparatus of claim 8, wherein to group the plurality of memory bits, the processor is configured to generate a bit bin map based on the grouped plurality of memory bits.

11. The apparatus of claim 8, wherein:

to derive the first bin threshold, the processor is configured to subtract the program threshold variation from the program threshold average; and to derive the second bin threshold, the processor is configured to add the program threshold variation to the program threshold average.

12. The apparatus of claim 8, wherein to determine the set of bits to which the data is to be written, the processor is configured to select the set of bits from the second bit group.

13. The apparatus of claim 8, to perform the partial program of the data, the processor is configured to:

write a bit value of "1" in the data to bits in the set of bits by use of a number of program pulses equal to the first bin threshold; and write a bit value of "0" in the data to bits in the set of bits by use of zero program pulses.

\* \* \* \* \*

UNITED STATES PATENT AND TRADEMARK OFFICE
CERTIFICATE OF CORRECTION

| | | |
|---|---|---|
| PATENT NO. | : 9,646,178 B2 | Page 1 of 1 |
| APPLICATION NO. | : 14/515425 | |
| DATED | : May 9, 2017 | |
| INVENTOR(S) | : Kan | |

It is certified that error appears in the above-identified patent and that said Letters Patent is hereby corrected as shown below:

In the Claims

In Column 23, Line 17, in Claim 8, delete "and to" and insert -- and a --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*